United States Patent [19]
Fedde et al.

[11] Patent Number: 5,523,753
[45] Date of Patent: Jun. 4, 1996

[54] VEHICLE DETECTOR SYSTEM WITH PERIODIC SOURCE FILTERING

[75] Inventors: Mickiel P. Fedde, Eagan; Kevin W. Klimisch, Wyoming, both of Minn.

[73] Assignee: Minnesota Mining and Manufacturing Company, St. Paul, Minn.

[21] Appl. No.: 304,509

[22] Filed: Sep. 12, 1994

[51] Int. Cl.$^6$ ............................................. G08G 1/01
[52] U.S. Cl. .................. 340/933; 340/939; 340/941; 377/28; 324/654
[58] Field of Search ................................ 340/933, 941, 340/939; 377/9, 10, 12, 28; 324/207.15, 654

[56] References Cited

U.S. PATENT DOCUMENTS

| | | | |
|---|---|---|---|
| 3,609,679 | 9/1971 | Updegraff et al. | 340/38 L |
| 3,775,742 | 11/1973 | Koerner et al. | 340/38 L |
| 3,868,626 | 2/1975 | Masher | 340/38 L |
| 3,873,964 | 3/1975 | Potter | 340/38 L |
| 3,943,339 | 3/1976 | Koerner et al. | 235/92 TC |
| 3,984,764 | 10/1976 | Koerner | 324/41 |
| 3,989,932 | 11/1976 | Koerner | 235/92 FQ |
| 4,131,848 | 12/1978 | Battle | 324/236 |
| 4,234,923 | 11/1980 | Eshraghian et al. | 364/436 |
| 4,276,539 | 6/1981 | Eshraghian et al. | 340/38 L |
| 4,368,428 | 1/1983 | Dijkman | 324/178 |
| 4,369,427 | 1/1983 | Drebinger et al. | 340/38 L |
| 4,449,115 | 5/1984 | Koerner | 340/941 |
| 4,459,561 | 7/1984 | Clark et al. | 331/65 |
| 4,472,706 | 9/1984 | Hodge et al. | 340/941 |
| 4,491,841 | 1/1985 | Clark | 340/939 |
| 4,668,951 | 5/1987 | Duley et al. | 340/941 |
| 4,680,717 | 7/1987 | Martin | 364/436 |
| 4,829,546 | 5/1989 | Dueckman | 377/6 |
| 4,862,162 | 8/1989 | Duley | 340/938 |
| 4,873,494 | 10/1989 | Jefferis | 331/65 |
| 4,949,054 | 8/1990 | Briefer | 331/117 R |
| 5,028,921 | 7/1991 | Potter | 340/939 |
| 5,153,525 | 10/1992 | Hoekman et al. | 324/655 |
| 5,239,209 | 8/1993 | Hoekman | 307/351 |
| 5,247,297 | 9/1993 | Seabury et al. | 340/941 |
| 5,278,555 | 1/1994 | Hoekman | 340/941 |
| 5,361,064 | 11/1994 | Hamer et al. | 340/939 |

FOREIGN PATENT DOCUMENTS

| | | |
|---|---|---|
| 0004892A2 | 10/1979 | European Pat. Off. . |
| 0089030A2 | 9/1983 | European Pat. Off. . |
| 0126958A2 | 12/1984 | European Pat. Off. . |
| 572831 | 9/1977 | U.S.S.R. . |
| 752448 | 8/1980 | U.S.S.R. . |
| 1398937 | 6/1975 | United Kingdom . |

*Primary Examiner*—Donnie L. Crosland
*Attorney, Agent, or Firm*—Gary L. Griswold; Walter N. Kirn; Kari H. Bartingale

[57] ABSTRACT

A detector system filters the effects of periodic noise such as magnetic flux from nearby power lines or other periodic sources. The detector system further adapts in the case that the system incorporates microloops for the inductive sensors. The detector system further counts multiple vehicles while in presence mode. The detector system also logging of vehicle data and system faults.

5 Claims, 8 Drawing Sheets

VEHICLE DETECTOR SYSTEM WITH PERIODIC SOURCE FILTERING

BACKGROUND

The present invention relates to detector systems which detect the passage or presence of a vehicle or other object over a defined area. These detector systems are often part of a traffic actuated control system for controlling traffic signal lights.

The detector systems commonly employ an inductive sensor in or near the area to be monitored and sense changes in the sensor's magnetic field to detect the presence or passage of vehicles or other objects. The inductive sensor can take a number of different forms, but commonly is a wire loop which is buried in the roadway and which acts as an inductor.

Known detector systems also include circuitry which operates in conjunction with the inductive sensor to measure the changes in inductance and to provide output signals as a function of those inductance changes. An oscillator circuit connected to the inductive sensor produces a signal having a frequency which is dependent on sensor inductance. The sensor inductance is in turn dependent on whether the inductive sensor is loaded by the presence of a vehicle. The detector system measures changes in inductance of the inductive sensor by monitoring the frequency of the oscillator output signal.

In detector systems known in the art, the detector defines sequential detect cycles. During each detect cycle, cycles of the loop oscillator signal are counted. Concurrently, a second counter measures the duration of a predetermined number of oscillator cycles by counting pulses provided by a very accurate clock pulse source. The measured duration is then compared with a reference duration (whose value is based upon the measured duration during prior detect cycles) and the difference is indicative of a change in oscillator frequency and thus also a change in loop inductance. If the count differs from the reference by at least a threshold amount, the detection system generates a "call" to signal presence of a vehicle.

The detector systems known in the art suffer several disadvantages. First, if the inductive sensor is located near electric power distribution lines, magnetic flux from the power lines can alter the apparent inductance of the loop and therefore the accuracy of the detector system. This fluctuation, which is at the frequency of the power line (60 Hz in the United States), manifests itself as a variation in the value of the measured frequency. Because the measurement period of current vehicle detectors in making a single measurement is usually much shorter than the period of the power line sinusoid, the measured inductance will differ depending upon when the measurement was taken during the cycle of the power line signal. If this condition occurs, and depending on the phase of the power line signal at which the measurement is taken, the variation may be large enough to cause an apparent reduction in sensitivity of the inductive sensor. This can result in false vehicle detections or failure to detect a vehicle entering the detection area. Another drawback is that the vehicle detector may continuously register the presence of a vehicle, even when a vehicle is not present.

Another drawback of known detector systems lies in their mechanism for adapting to compensate for environmental changes which can affect sensor inductance. Commonly, the difference between the measured and reference durations is utilized to modify the reference duration toward the measured duration to thus allow the detector to self-tune or adapt to varying environmental conditions. The reference is modified slowly in response to small deviations or differences between the measured and reference time durations. This mechanism allows the detector to detect vehicles over a relatively long period of time, and under varying environmental conditions.

Although the above described mechanism is adequate for detector systems employing traditional inductive loops, errors arise in systems employing earth's field type inductive sensors ("microloops") as the inductive sensor. In a microloop system, magnetic elements of a vehicle such as stereo speakers, etc. can cause an initial variation in the non-call direction before the transition in the call direction. In a traditional vehicle detector, this initial non-call variation causes the reference to adjust to the maximum level of the initial non-call variation. This premature adaptation of the reference in response to the initial non-call deviation can result in failure to detect the vehicle leaving the area of the microloop, thus resulting in a "locked call" condition.

Another drawback of tradition detector systems is their inability of count multiple vehicles while in "presence mode". In presence mode, the CALL signal is held active for as long as a vehicle is present in the detection area. In known detector systems, this prevents the system from detecting subsequent vehicles entering the detection area while another vehicle is present.

Finally, maintenance on traditional detector systems is often difficult. Several types of faults can occur in a detector system, including shorts, opens, and large changes in inductance. The opens can be caused by shifting ground, cutting of loop wire, corroding contacts or other disturbances of the loop wire. Shorts are cause by moisture and disturbances of the wire. Changes in inductance can by caused by moisture shorting out the turns of the inductive sensor. These faults can come and go because of changes temperature and moisture.

When any of these faults occur, the system will fail to operate properly. Since these faults can come and go, the problem may not be apparent when a technician services the equipment, making corrective maintenance difficult.

SUMMARY

To overcome the drawbacks in the art described above, and to overcome other problems which will become apparent upon reading the present specification, the present detector system filters the effects of periodic noise such as magnetic flux from nearby power lines. The inductance measurement is averaged over one or more cycles of the power line sinusoid. Power line filtering setups liar different power line frequencies are stored. An onboard microprocessor reads the stored power line filtering set up and sets its sample time accordingly. The loop sensing is then averaged over a measurement period equal to one or more cycles of the power line sinusoid. Also, because the inductance measurement is taken over integer multiple of the power line sinusoid, the noise from the positive part of the power line sinusoid is cancelled with the negative part. Because the inductance measurement is not directly dependent upon the power line signal, it is independent of the phase of the power line signal over which the inductance measurement is taken. The present detector system requires no hardware to sense the frequency or phase of the power line signal. The result is a lower unit cost, greater reliability and safer handling.

The present detector system further provides for adaptation in the case that the system includes microloops for the inductive sensors. The present detector system further provides for multiple vehicle counting in presence mode. The present detector systems also provides for logging of faults, vehicle speeds, sizes and road occupancy.

DETAILED DESCRIPTION OF THE PREFERRED EMBODIMENTS

Figure 1:
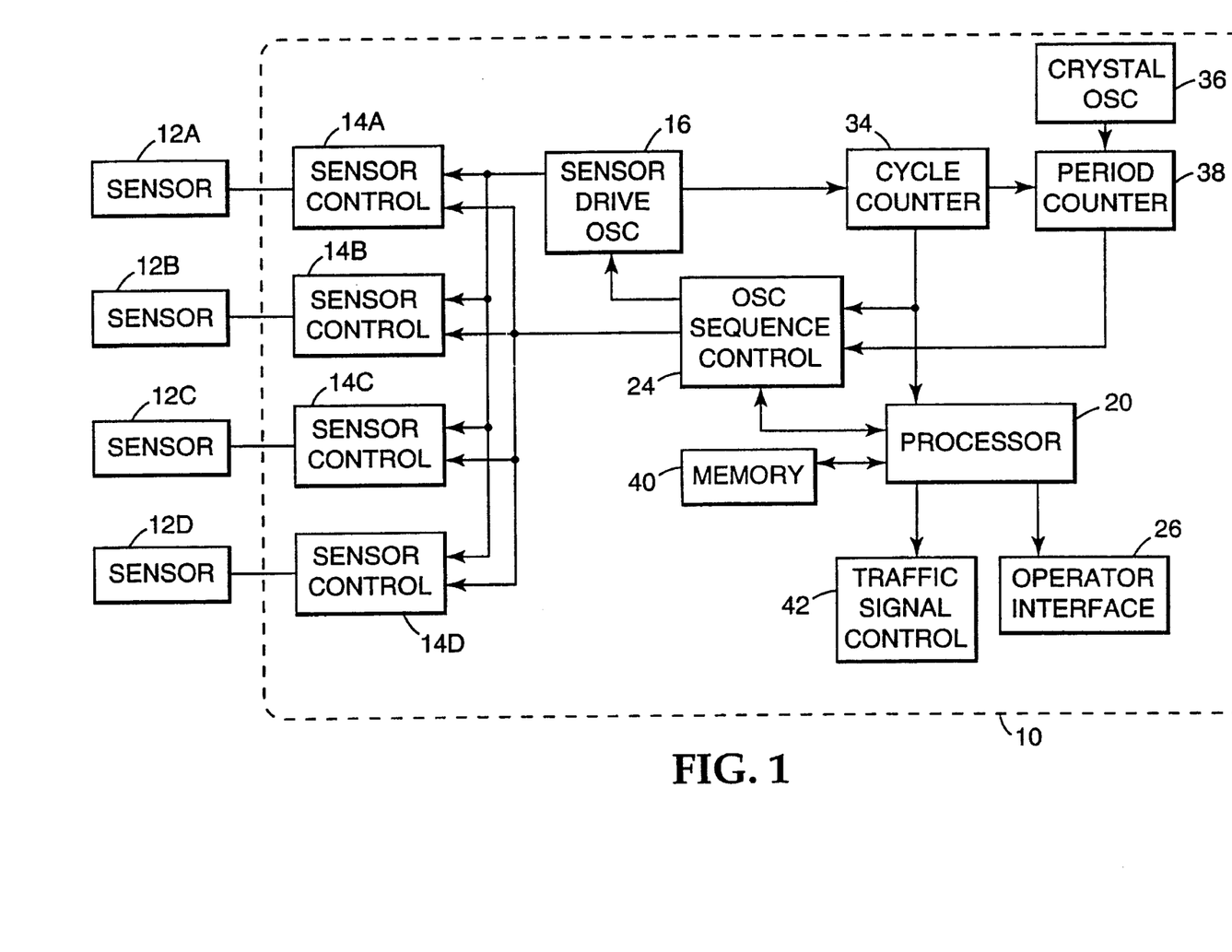
FIG. 1 is a block diagram of the present detector system.

Detector system 10 shown in FIG. 1 is a four channel system which monitors the inductance of inductive sensors 12A, 12B, 12C and 12D. In the preferred embodiment, each inductive sensor 12A–12D is an earth's field type inductive sensor, or "microloop", such as that described in U.S. Pat. No. 4,449,115 to Koerner, issued May 15, 1984 and entitled "APPARATUS FOR DETECTING FERROMAGNETIC MATERIAL", which is incorporated herein by reference. However, it shall be understood that other types of inductive loops could also be used, such as that described in U.S. Pat. No. 3,984,764, to Koerner, issued Oct. 5, 1976.

Each inductive sensor 12A–12D is connected to one of four sensor controls 14A–14D, respectively. Sensor drive oscillator 16 is selectively connected through control circuits 14A–14D to one of the inductive sensors 12A–12D to provide a drive current to one of the inductive sensors 12A–12D. The particular inductive sensor 12A–12D which is connected to sensor drive oscillator 16 is based upon which input circuit 14A–14D which receives a sensor select signal from oscillator sequence controller (OSC) 24. Sensor drive oscillator 16 produces an oscillator signal having a frequency which is a function of the inductance of the inductive sensor 12A–12D to which it is connected.

The overall operation of vehicle detector 10 is controlled by processor 20. Processor 20 preferably includes on-board read only memory (ROM) and random access memory (RAM) storage. In addition, non-volatile memory 40 stores additional data such as operator selected settings input through operator interface 26.

Operator interface 26 allows an operator or technician to interact with the detector system through a serial port. Operator interface 26 includes a visual interface and dam I/O through which the operator inputs certain user selectable settings, some of which will be described in more detail below. Operator interface 26 also allows the operator to download information accumulated and stored by the detector system, such as vehicle counts, relative time that a detect occurred, length of time that a vehicle was over the detection area, etc. to a laptop or other computer. From this information, the computer can calculate vehicle speed, size and other relevant data.

Cycle counter 34, crystal oscillator 36, period counter 38, and processor 20 form detector circuitry for detecting the frequency of the sensor drive oscillator signal. Counters 34 and 38 may be discrete counters (as illustrated in FIG. 1) or may be fully or partially incorporated into processor 20.

The basic principle of operation of the detector system is to monitor the inductance of the inductive sensor for changes in inductance which signify vehicle presence. To do so, OSC 24 provides sensor select signals to sensor controls 14A–14D to connect sensor drive oscillator 16 to inductive sensors 12A–12D in a time multiplexed fashion. When OSC 24 selects one of the input circuits 14A–14D. As sensor drive oscillator 16 is connected to an inductive load (e.g., input circuit 14A and sensor 12A) it begins to oscillate. After a brief stabilization period, OSC 24 enables period counter 38 and cycle counter 34, which counts cycles of a very high frequency (32 MHz in the preferred embodiment) signal from crystal oscillator 36. The oscillator signal is supplied to cycle counter 34, which counts cycles of the sensor drive oscillator.

The measurement period is controlled by the length of a predetermined number of sensor drive oscillator cycles. When cycle counter 34 reaches the predetermined number of sensor drive oscillator cycles, it provides a control signal to period counter 38, which causes period counter 38 to stop counting. The final count contained in period counter 38 is a function of the frequency of the sensor drive oscillator signal, and is therefore indicative of the inductance of the inductive sensor.

The measurement value, contained in period counter 38, is then compared to a reference value. If the measurement value differs in the call direction from the reference value by at least a threshold value, this indicates that a vehicle is present. Processor 20 then provides the appropriate output signals to the operator interface 26 and the traffic signal control 42, as appropriate.

Periodic Source Filtering

The above described traditional measurement technique is prone to error when power lines or other periodic sources having associated magnetic fields are present near the detection area. Such periodic sources, when near one or more of the inductive sensors 12A–12D, produce magnetic flux which induce changes in the inductance of the inductive sensor and therefore the frequency of the sensor drive oscillator. The present detector system therefore includes a periodic source filtering mode of operation which is enabled when the system is to operate in proximity to power lines or other periodic source.

Filtering of periodic source noise is accomplished by averaging the inductance measurement over a integer multiple number of cycles of the periodic source signal. This method changes the length of the measurement period from depending on a predetermined number of oscillator cycles, as in traditional vehicle detectors described above, to depending on a predetermined length of time equal to an integer multiple of cycles of the periodic source signal. In doing so, noise induced during the positive portion of the periodic signal are cancelled by noise induced during the negative part.

In periodic source filtering mode, a special measurement period, called the filtering period, is used. A counter internal to processor 20 is set to a length of time equivalent to one or more cycles of the periodic signal. For example, in the United States, the power line frequency is 60 Hz, thus resulting in a filtering period that is an integer multiple of 16.67 ms. For a 50 Hz frequency, the filtering period is a multiple of 20 ms. The frequency of the power line or other periodic source at issue is programmed at setup by the operator via operator interface 26.

Figure 2:
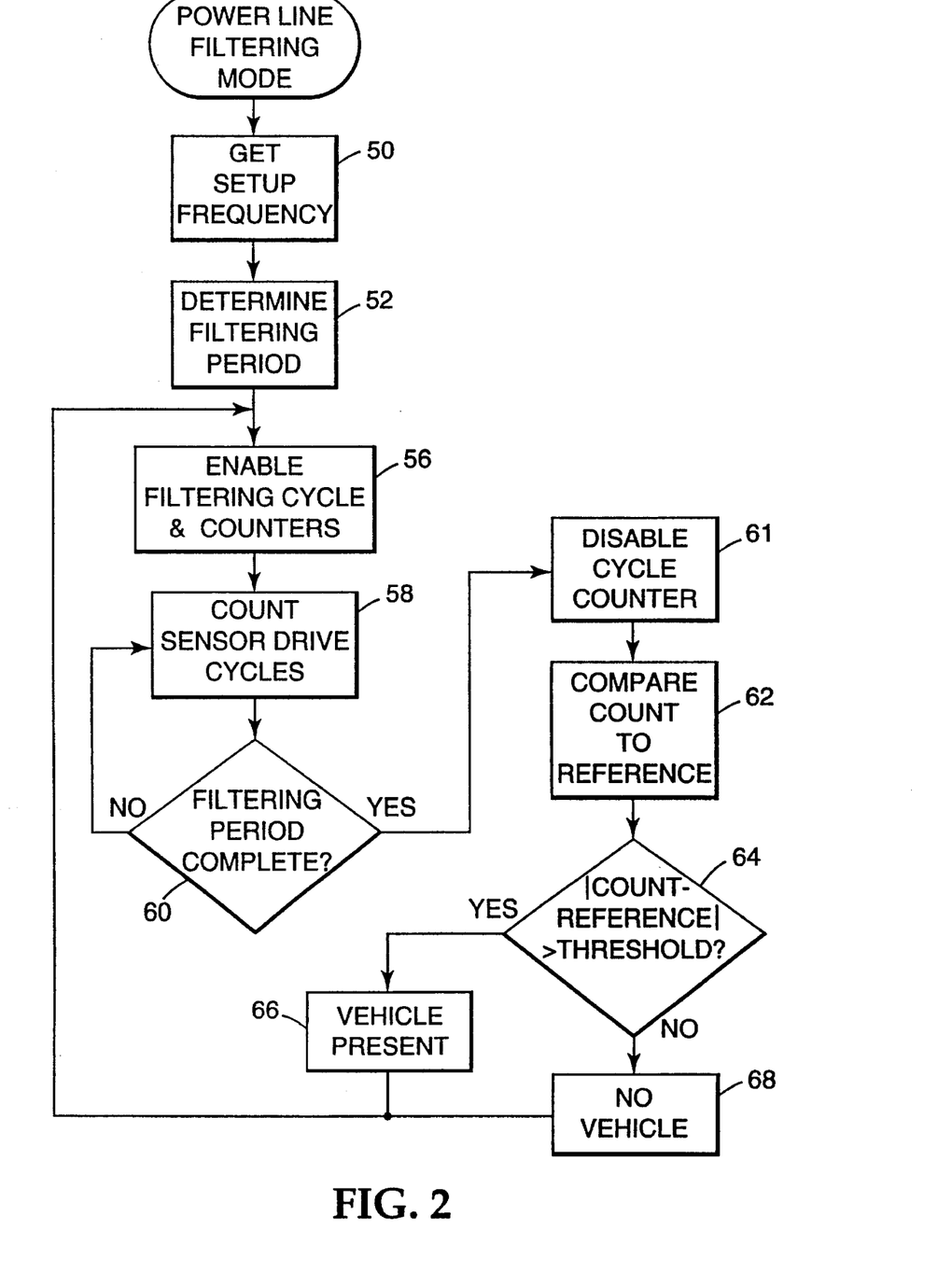
FIG. 2 shows a diagram of the control flow of the power line filtering algorithm of the present detector system.

The operation of the periodic source filtering of the present detector system is shown in flow diagram form in FIG. 2. During setup, the operator inputs the parameters, such as the signal frequency, of the relevant periodic source. In operation, processor 20 reads the frequency setup at block 50 and determines the filtering period for the inductance measurement at block 52.

At block 56, the cycle and period counters are enabled. In blocks 58 and 60, the oscillations of the sensor drive oscillator are counted over the filtering period which is controlled by processor 20. When processor 20 determines that the end of the filtering period has been reached, it disables the cycle counter. The count contained in the cycle counter is a function of the frequency of the sensor drive oscillator signal, and is thus indicative of the inductance of the inductive sensor.

The count contained in the cycle counter is compared at block 62 to a reference count. If at block 64 the count differs from the reference by at least a threshold value, vehicle presence is indicated at block 66. Because the inductance measurement occurs over an integer multiple number of cycles of the periodic signal, the error induced during the positive half of the cycle is cancelled by that induced during the negative half of the cycle. Errors induced by power lines or other periodic sources are thus greatly reduced. In addition, because the filtering is controlled by a timer internal to the processor, no additional hardware is required to sense the phase or frequency of the periodic source signal. This is in contrast to other systems for reducing these effects, which require extensive, complex and costly additional hardware.

Presence Mode Counting

The present detector systems allows multiple vehicle counting while in presence mode. In presence mode, the CALL line is held active for as long as a vehicle is present in the detection area. In known detector systems, this prevents counting of multiple vehicle counting is not possible while in presence mode. To enable detection of multiple vehicles in the detection area, the present vehicle detector adopts a new, in-call reference after a first vehicle enters the detection area. The in-call reference is in addition to and not substituted for the normal reference. Each time a vehicle enters the detection area, a new in-call reference is adopted. In addition, an in-call threshold, is adopted while in presence mode. The system detects subsequent vehicles by comparing the current loop count to the current in-call reference when in presence mode (e.g., when the CALL signal is active). If the count differs from the in-call reference by at least the in-call threshold, the vehicle count is incremented.

Operation of the present detector system in multiple vehicle count mode will now be explained with reference to Table 1 and to FIGS. 3A through 3C.

TABLE 1

| TIME | IN-CALL REF | CALL | COUNT |
|---|---|---|---|
| $t_0$ | NONE | OFF | 0 |
| $t_1$ | IC REF$_1$ | ON | 1 |
| $t_2$ | IC REF$_2$ | ON | 2 |

TABLE 1-continued

| TIME | IN-CALL REF | CALL | COUNT |
|---|---|---|---|
| $t_3$ | IC REF$_3$ | ON | 3 |
| $t_4$ | IC REF$_2$ | ON | 3 |
| $t_5$ | IC REF$_1$ | ON | 3 |
| $t_6$ | IC REF$_2$ | ON | 4 |
| $t_7$ | IC REF$_1$ | ON | 4 |
| $t_8$ | NONE | OFF | 4 |

Figure 3A:
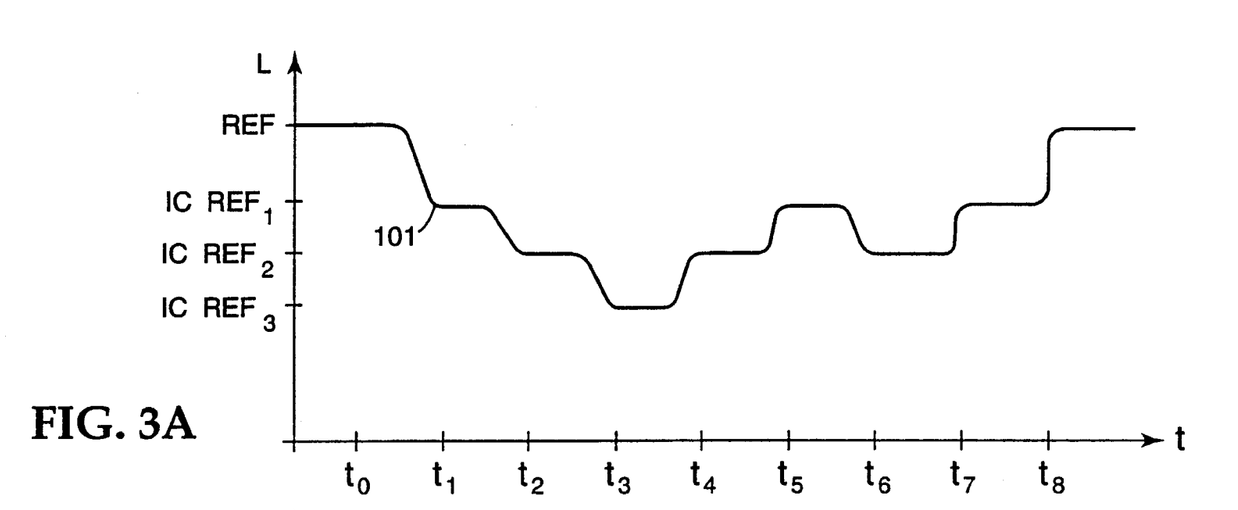
FIGS. 3A–3C show plots of loop inductance versus time, and timing diagrams of the CALL and IN-CALL signals, respectively.

FIG. 3A shows a plot of the inductance of the detector system versus time. At time $t_1$, a first vehicle enters the detection area and causes an associated decrease in the inductance L of the inductive sensor. If the difference between the measured inductance and the reference REF is at least equal to a first threshold value $TH_1$ (see FIG. 4), a presence CALL signal activates as shown in FIG. 3B, and the vehicle count is incremented by one as shown in FIG. 3C and in Table 1. In presence mode, the CALL line is held active for as long as a vehicle is present in the detection area.

At times $t_2$ and $t_3$, the first vehicle is still present in the detection area, and a second and third vehicle enter the detection area, respectively. The second and third vehicles also cause associated decreases in the inductance L as shown in FIG. 3A. To enable detection of multiple vehicles in the detection area, the present detector system adopts a new, in-call reference IC REF$_1$ after the first vehicle enters the detection area. The in-call reference is in addition to and not substituted for the normal reference REF. Also, a new in-call threshold $TH_2$ is adopted. Detection of multiple vehicles in presence mode is obtained by comparing the current loop count to the current in-call reference. Thus at time $t_2$, the current loop count is compared to the in-call reference IC REF$_1$. At time $t_3$, the current loop count is compared to the in-call reference IC REF$_2$. If the count differs from the in-call reference by at least an in-call threshold value $TH_2$, the vehicle count is incremented at times $t_2$ and $t_3$ as shown in FIG. 3C and in Table 1.

At time $t_4$, one of the vehicles has left the detection area, causing an associated increase in loop inductance as shown in FIG. 3A. The in-call reference is accordingly adjusted to IC REF$_2$ as shown in Table 1. Similarly, at time $t_5$, another vehicle has left the detection area and the in-call reference is adjusted to IC REF$_1$. Because at least one vehicle is still present over the detection area, the CALL signal remains active as shown in FIG. 3B.

Figure 3B:
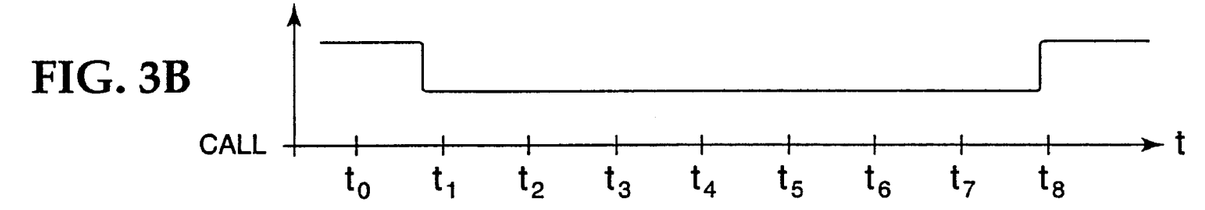
Figure 3C:
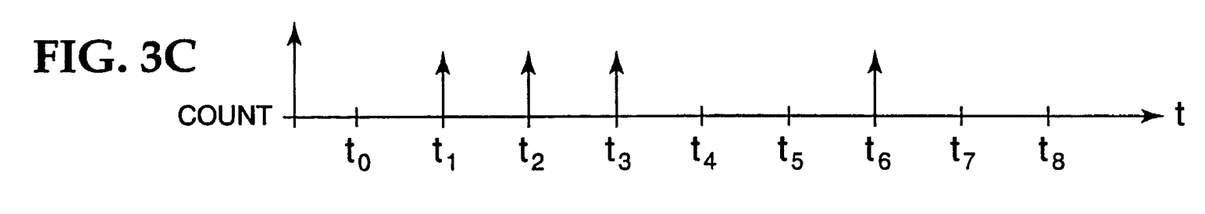

At time $t_6$, another vehicle enters the detection area causing an associated decrease in loop inductance, adoption of a new in-call reference IC REF$_2$ as shown in Table 1, and the vehicle count is incremented as shown in FIG. 3C and in Table 1.

At times $t_7$ and $t_8$, two more vehicles exit the detection area. Thus, at time $t_8$ no vehicles remain in the detection area and the CALL signal goes inactive as shown in FIG. 3B.

The in-call reference is adopted when the decrease in inductance is less than a fraction of the normal threshold after a given period of time. The fraction and the period of time are user defined, but are preferably ¼ the normal threshold and 200 ms, respectively.

When the inductance is increasing, such as when a vehicle leaves the detection area, the in-call reference follows the changes until the inductance stabilizes or the detector system goes out of call (as at time $t_8$ in FIG. 3B).

Figure 4:
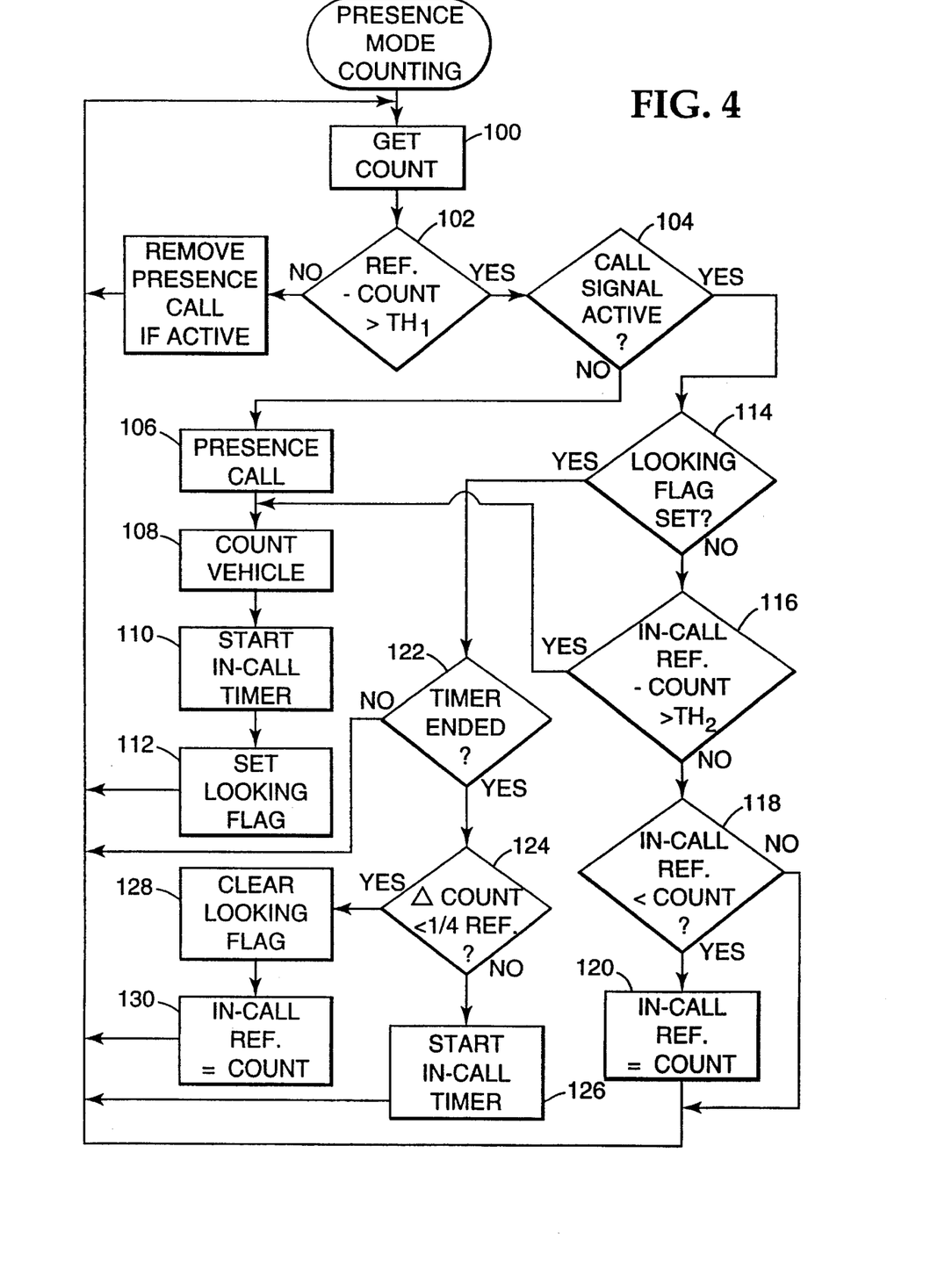
FIG. 4 shows a flow diagram of the multiple vehicle count mode.

The control flow of the multiple vehicle count in presence mode is shown in flow diagram form in FIG. 4. This mode of operation can be enabled and disabled. Also, the in-call threshold and in-call adapt time are all settable by the operator via operator interface 26 shown in FIG. 1.

Referring again to FIG. 4, the present detector system gets the current count at block 100 and compares it to the reference count at block 102. If the difference is at least equal to the threshold value $TH_1$, the system checks whether the CALL signal is active at block 104. If the CALL signal is not active at block 104, it is activated at block 106 and the vehicle count is incremented at block 108.

When a vehicle is detected, the system must determine when the vehicle is fully over the detection area. This corresponds to when the inductance plot has sufficiently flattened out as indicated by reference numeral 101 in FIG. 3A. To find this, the present detector system starts an in-call timer at block 110 and sets a looking flag at block 112. The looking flag indicates that the detector is looking for when a vehicle is over the loop. On loop criteria at blocks 122 and 124 (described below) determine whether the vehicle is fully over the detection area.

If at block 104 the CALL signal is active, the system checks at block 114 whether the looking flag is set. If the looking flag is set, the previous vehicle has not met the on loop criteria (described below with respect to blocks 122 and 124). At this point, the system cannot yet check for presence of another vehicle because the inductance has not sufficiently flattened out. If at block 122 the in-call timer has not ended, the system returns to block 100. If the in-call timer has ended, the slope of the inductance is compared against the in-call slope threshold. If the decrease in inductance is less than a fraction of the normal threshold $TH_1$, the vehicle is determined to be over the detection area. The looking flag is cleared at block 128 and a new in-call reference is adopted at block 130. The adoption of the new in-call reference at block 130 corresponds to the adjustment of the in-call reference caused by vehicles entering the detection area at times $t_1$, $t_2$, $t_3$, and $t_6$ as shown in FIG. 3A and in Table 1.

If at block 124 the the change in count is not less than the fraction of the reference, the in-call timer is started at block 126.

Returning to block 114, if the looking flag is not set, the previous vehicle has met the on loop criteria of blocks 122 and 124. At this point, the detector system checks for additional vehicles in the detection area by proceeding to block 116.

At block 116, the system compares the count to the current in-call reference. If the count differs from the in-call reference by at least the in-call threshold $TH_2$, the vehicle is counted at block 108 and the system again proceeds to determine when the vehicle is fully over the detection area as described above with respect to blocks 110 and 112.

If at block 116 the count and the in-call reference do not differ by at least the in-call threshold $TH_2$, the detector system compares the count to the in-call reference at block 118. If the in-call reference is less than the current count, the in-call reference is adjusted to the current count at block 120. Thus, blocks 118 and 120 allow the in-call reference to be adjusted to inductance increases such as those caused by a vehicle leaving the detection area at times $t_4$, $t_5$, $t_7$ and $t_8$ as in FIG. 3A and in Table 1.

Data Logging

The present detector system provides the ability to determine and store vehicle counts, and maintains a time stamp of when a detection occurs. The present detector system provides several options for viewing the information obtained. First, stored data can be retrieved on site by a laptop computer via the serial port in the operator interface. Stored data can also be retrieved from a location remote from the system site via the modem in the operator interface. Information obtained by the present detector system can also be viewed in real time either on site or remotely.

The detector system, under command of the computer can also send the count, reference count, and loop count every designated period of time. The preferred period of time is 0.1 second. Using this information, a computer program can graph loop activity showing the size of a vehicle both lengthwise and magnetically. Other environmental loop parameters can also be tracked, thus assisting in diagnosis of physical problems in the loop or system wiring.

Once it has received the information from the vehicle detector, the computer can calculate vehicle size and speed using techniques known in the art. For example, vehicle speed can be determined by using a loop to loop time. Vehicle size is related to the vehicle speed, time that the vehicle is over the detection area and the size of the detection area. Road occupancy is determined from the vehicle count over certain periods of time. The road occupancy data allows traffic management personnel to determine road occupancy versus time of day to thus determine heavy or light road usage times. The information thus obtained can be used by traffic management personnel to optimize setup of traffic control equipment.

In addition to logging vehicle parameters and road occupancy data, the present detector system also stores the time, date and type of errors and faults which occurs during operation of the system. In the preferred embodiment, the three basic fault are short circuits, open circuits and large changes in inductance (approximately 25% change in the preferred embodiment). Short circuits are detected when the sensor drive oscillator frequency is greater than a frequency threshold set by the operator. Open circuits are detected when the sensor drive oscillator frequency is lower than a frequency set by the operator. In the preferred embodiment, this frequency is 8 kHz. These are problems which come and go depending upon the environment. For example, many faults are caused by nighttime moisture, humidity and temperature.

The operator interface allows the operator to set the threshold frequency for short and open circuits. The user can then set an arbirtrary criteria for each case. This allows the detetor to have an arbitrary threshold. For example, if a detection area in the road is a very long distance from the vehicle detector itself, the length of the wire from the inductive sensor to the detector represents a significant inductance of the detector. A short at or near the point where the sensor is connected to the detector would not be a conventional short but could be detected if a threshold point is set at the appropriate value.

The time and date are determined by a relative time clock. In the preferred embodiment, the relative time clock tracks time in 50 ms increments. This relative time clock is set to zero when the unit is reset or powered off. When a fault occurs the relative time is stored by the unit. The computer can then at a later time read the relative time of the fault as well as the present relative time. Using these two numbers, as well as the day/date clock in the computer, the exact date and time of the fault can be computed even up to a period of several years. This is accomplished without the cost of a real time chip on the detector unit, but instead requires only software on the processor 20.

The fault log can be viewed as described above by the operator or technician. This allows the service technician to see time of day problems such as recurring nighttime short circuits caused by moisture. The fault log allows the technician to pinpoint the exact nature of the problem and thus decrease system repair time.

Microloop Adaptation

Figure 5A:
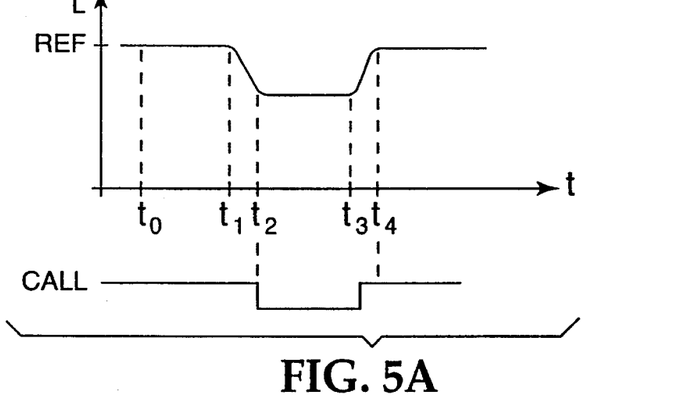
FIGS. 5A–5E show plots of loop inductance versus time for a standard loop and microloop detector systems.

Operation of a traditional loop detector is shown in FIG. 5A. From time $t_0$ to time $t_1$, there is no vehicle present over the loop. The measured and reference inductance will be substantially equal and no CALL signal will issue. Also, the reference will not adapt as no change in the call or non-call direction has occurred.

At time $t_2$, a vehicle has arrived over the loop, thus decreasing the loop inductance and increasing the frequency of the sensor drive oscillator signal. If the deviation differs from the reference by at least a threshold value a call signal will issue. Assuming the time between $t_1$ and $t_2$ is relatively short the reference will not adapt significantly as adaptation in the call direction is slow. Between time $t_2$ and $t_3$, the vehicle is over the detection area.

At time $t_3$, the vehicle leaves the loop, causing the loop inductance to increase. When this is detected, the CALL signal is removed thus signalling that the vehicle has left the loop.

Figure 5B:
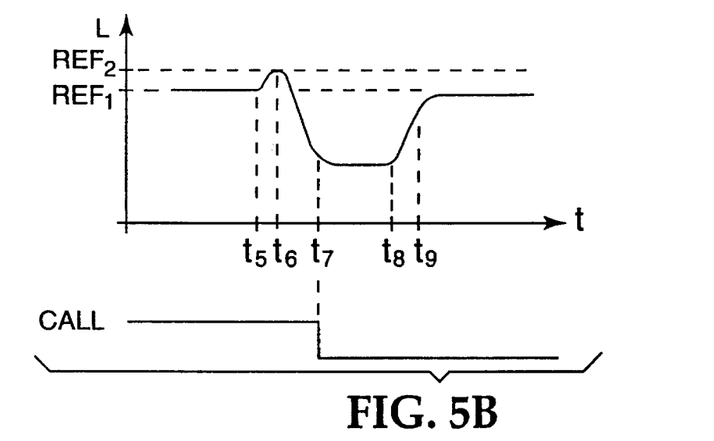

The above described operation of traditional loop detectors is problematic for use with earth's field type inductive sensors ("microloops"). The problem is illustrated in FIG. 5B. Speakers or other magnetic elements on a vehicle entering the detection area at time $t_5$ cause the inductance of the microloop to have an initial deviation in the non-call direction. In traditional detector systems described above, the reference would adjust from the initial level $REF_1$ to the maximum of the non-call deviation $REF_2$. After the initial non-call deviation, a deviation in the call direction occurs in the interval between time $t_6$ and $t_7$. If the deviation is greater than the threshold, a CALL signal will issue. When the vehicle leaves the area of the microloop at time $t_9$, the fact that the reference adapted to the initial non-call deviation results in failure to detect exit of the vehicle from the area of the microloop because the inductance does not return to the value of the reference, which has adjusted to $REF_2$ due to the initial non-call variation. This results in a "locked call" condition.

To eliminate the above described drawbacks when traditional vehicle detection systems are used with microloop inductive sensors, the present detector system employs a microloop adaptation mode which allows the detector system to sense and distinguish non-call deviations caused by entry or exit of a vehicle over the microloop area from non-call deviations induced by environmental conditions. The magnitude and time duration of a non-call deviation are used as criteria for not adapting. Locked call conditions are thus prevented while still allowing the detector system to adapt to varying environmental conditions.

Figure 5C:
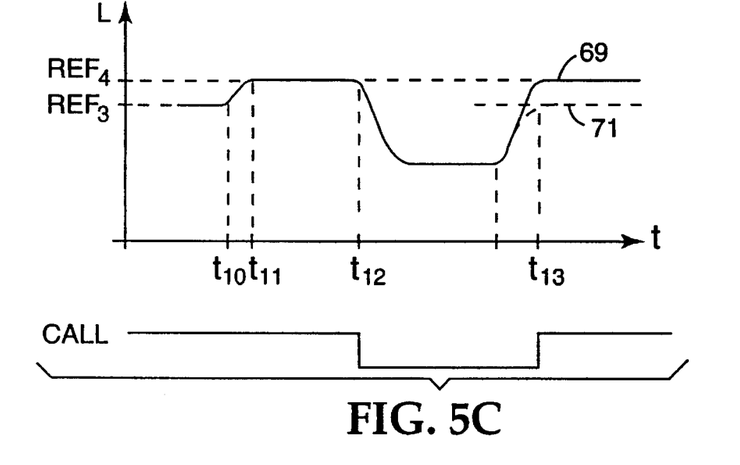

FIG. 5C illustrates operation of the microloop adaptation mode. At time $t_{10}$ through $t_{11}$, a non-call deviation occurs. If the non-call deviation is at least equal to a fraction of the threshold, the non-call deviation is monitored to ensure continuous presence over a time period at least equal to a microloop monitor period. If these conditions are met, the detector system presumes that the non-call deviation is due to an environmental change and the reference is adapted to compensate for that change. Thus in FIG. 5C, if the time period between $t_{11}$ and $t_{12}$ is at least equal to the microloop monitor period, the reference adapts from $REF_3$ to $REF_4$.

When the vehicle leaves the detection area, as indicated by reference numeral 69, the inductance returns to a level corresponding to $REF_4$ and the CALL signal is removed.

If the length of the non-call deviation is not at least equal to the microloop monitor period, however, the detector system assumes that the non-call deviation is due to a vehicle, and therefore does not adjust the reference from $REF_3$. When the vehicle leaves the loop, the inductance returns to a level corresponding to $REF_3$, as shown by dashed line 71, and the CALL signal is removed. Note that if the reference had been prematurely adjusted to $REF_4$ in this case, the detector system would not have detected the vehicle leaving the detection area thus resulting in a locked call condition. However, because the present detector system monitors for continuous presence of the non-call deviation for a predetermined length of time, non-call deviations due to vehicle entry are distinguished from those due to environmental changes, and a locked call condition is prevented.

In addition to ensuring that a non-call deviation is due to environmental conditions as opposed to vehicle entry, the present system must also compensate for the bipolar response of the microloop, in other words, for the potential of the microloop inductance to decrease instead of increase when a vehicle leaves the detection area.

Figure 6A:
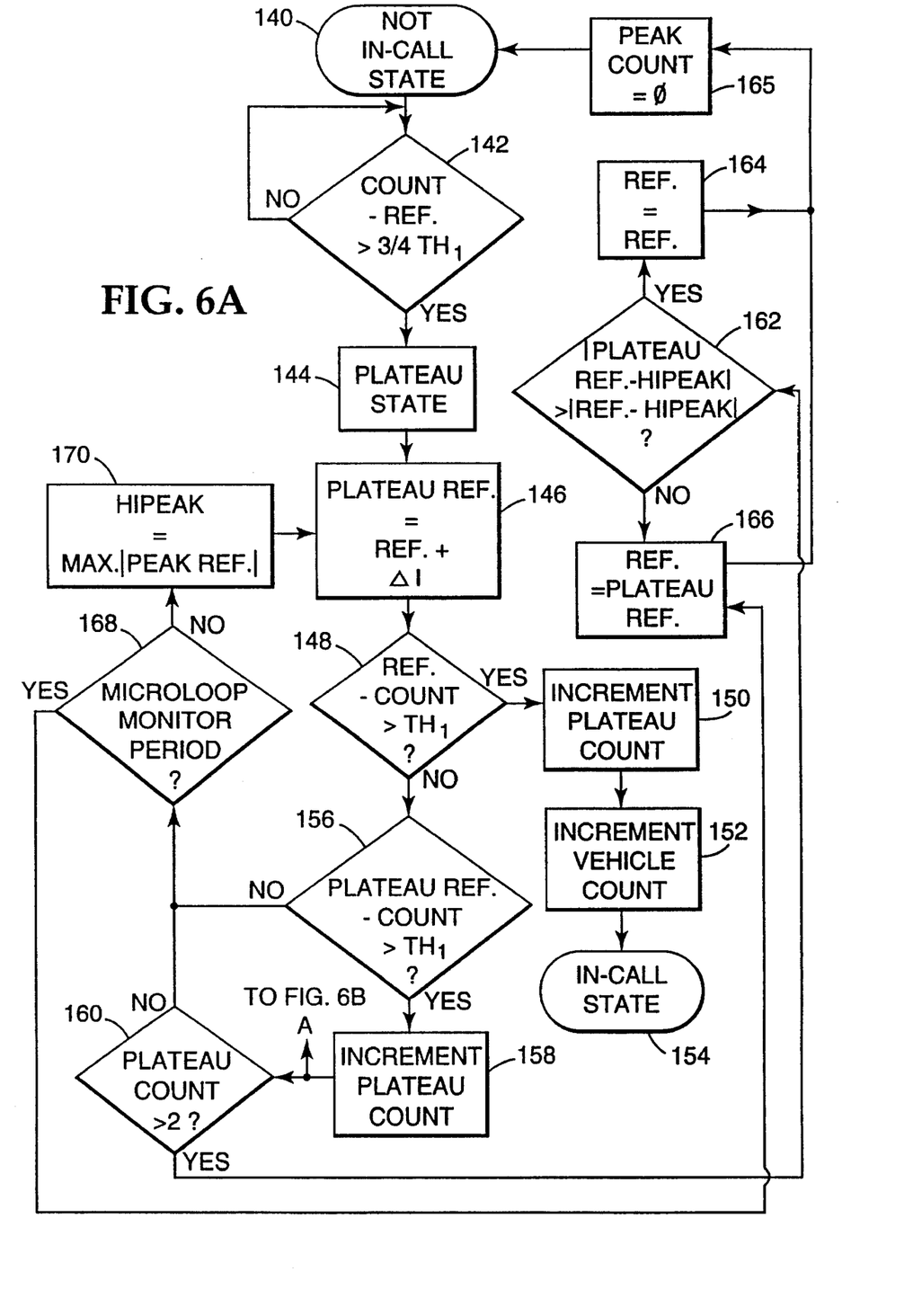
FIGS. 6A and 6B show flow diagrams of the microloop adaptation mode.
Figure 6B:
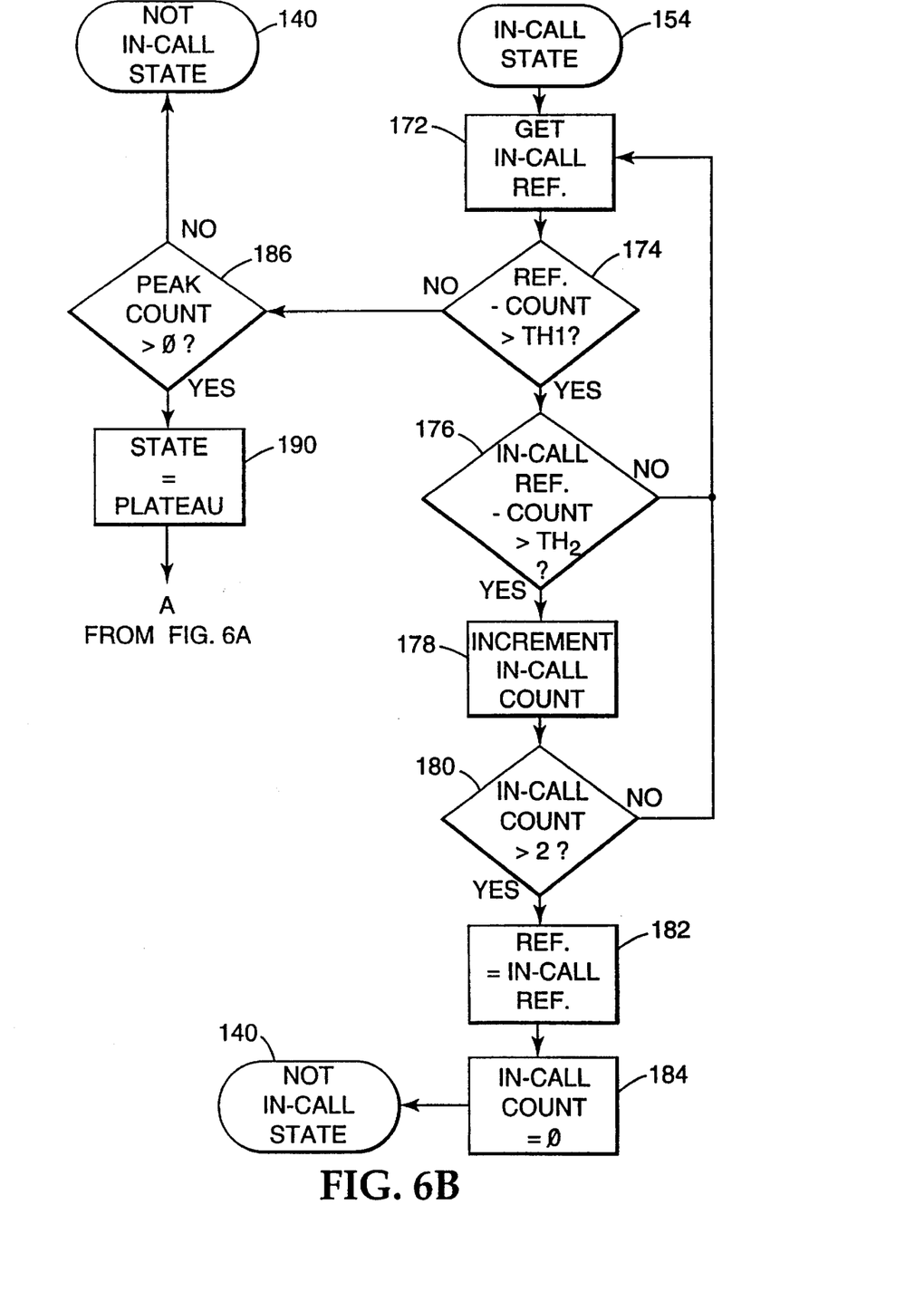

FIGS. 6A and 6B show flow diagrams of the present microloop adaptation mode. The present detector system is in this mode when the system setup input by the user indicate that the detector is operating with microloop inductive sensors. If a traditional magnetic loop is being used, traditional adaptation techniques are used as described above.

Figure 5D:
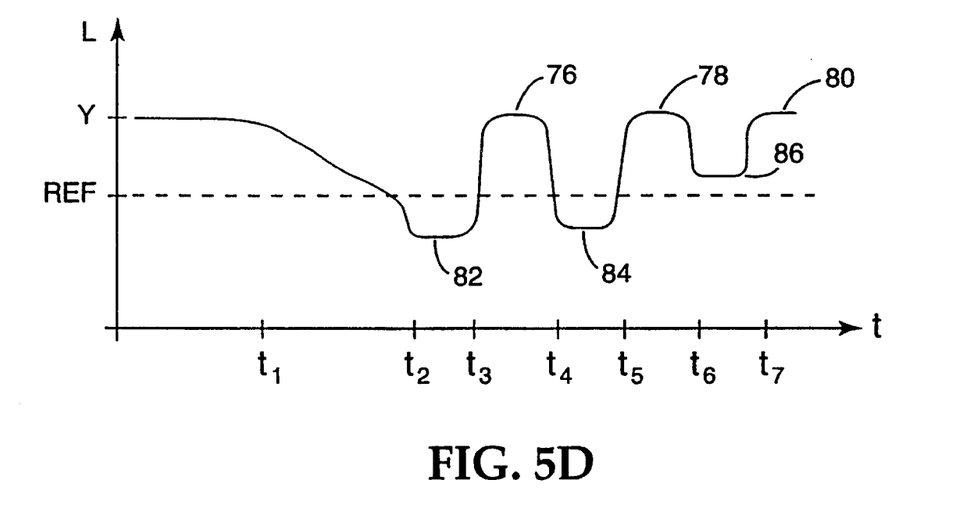
Figure 5E:
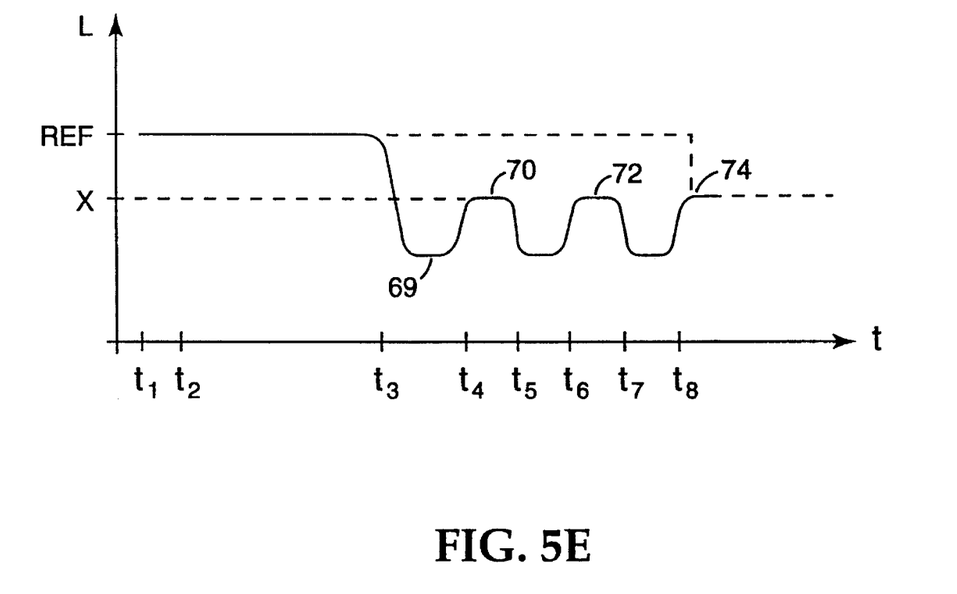

The diagram of FIG. 6A deals with the possibility of the reference being set too low, as shown in FIG. 5D. The diagram of FIG. 6B deals with the possibility of the reference being set too high, as shown in FIG. 5E.

The problem of the reference being set too low is illustrated in FIG. 5D. There, a vehicle enters the detection area very slowly between time $t_1$ and $t_2$, causing the reference through the normal slow adaptation in the call direction to adjust to REF. When the vehicle leaves at time $t_3$, the detector system sees the vehicle leave when the inductance reaches REF, but the inductance continues to rise to level Y. Because the inductance is higher than the reference, the system view this as a possible intial non-call deviation due to entry of a vehicle into the detection area and will enter the plateau state. In this case, the reference is set too low at level REF when it should in fact be at level Y.

The present detector system ensures that the reference is not set too low by counting detects while in the plateau state. After a predetermined number of plateau detects have occurred (two in the preferred embodiment), the reference is reset to an appropriate value.

FIG. 6A shows a flow diagram of the method of preventing the normal reference from being set too low. This process occurs when the system is not in call state at block 140. First, the system checks whether a non-call deviation of sufficient magnitude to monitor has occured by comparing the count to the reference at block 142. If the difference is greater than a predetermined threshold (¾ of the normal threshold $TH_1$ in the preferred embodiment), the system goes into plateau state at block 144. A variable "Plateau REF" follows the amplitude of the plateau at block 146. At block 148, the count and the reference are compared. If the difference is equal to at least the threshold value $TH_1$, the plateau count is incremented and the vehicle count is incremented at block 150. The system is then in-call state at block 154. If the difference was not at least equal to the threshold $TH_1$, the count is compared to the variable "Plateau REF" to determine whether a plateau count has occurred. If the difference is at least equal to a threshold value, the plateau count is incremented at block 158. However, no vehicle is counted at this point in time.

If at block 160 the plateau count is less than a predetermined number (2 in the preferred embodiment), the system checks whether the microloop monitor period has ended. If yes the reference is adjusted via block 166 to correct for the environmental change which caused the non-call deviation.

If at block 160 the plateau count is greater than than a predetermined number (2 in the preferred embodiment), the reference is adjusted to the value that is closest to the highest peak that occurred, either Plateau REF at block 166 or REF at block 164. The system then exits the plateau state and goes back to the not in call state at block 140.

If at block 168 the microloop monitor period has ended, the a variable HIPEAK is set to equal the highest plateau reference.

The problem of the reference being set too high is illustrated in FIG. 5E. There, a vehicle has entered the detection area and stayed there for a long period of time with a non-call influence caused by magnetic elements such as speakers in the door, causing the normal reference to adapt out the appearance of that vehicle by adjusting the value of the normal to reference to REF. At time $t_3$, the parked vehicle pulls across the detection area (indicated by reference numeral 69) then leaves the detection area at reference numeral 70. At this point, there are no vehicles present over the detection area. However, because of the initial adaptation in the non-call direction to REF, the detector system believes a vehicle is present. A new in-call reference corresponding to the level at point 70 is adopted. Meanwhile, the normal reference is set at REF, when in fact it should be at level X.

The present detector system ensures that the reference is not set too high by counting in-call detects. After two in-call detects have occurred, the system adjusts the normal reference to the in-call reference, and goes out of CALL. This prevents the reference from erroneously being set too high.

FIG. 6B shows a flow diagram of the method of preventing the normal reference from being set too high. This occurs when the detector system is erroneously in in-call mode as indicated by block 154. First, the in-call reference is obtained at block 172 as shown and described above with respect to FIGS. 3A–3C and FIG. 4. At block 174, the system checks to make sure it is still in-call by comparing the reference and the count. If the system is not in-call, the system checks whether the peak count is greater than zero. If it is, the system goes back into plateau state at block 190 and proceeds with block 160 as shown in FIG. 6A.

If the system is in call at block 174, the system checks for an in-call detection by comparing the count with the current in call reference at block 176. If block 176 does not detect a vehicle, the system gets the next count and continues checking. If a vehicle is detected, the number of in-call detects is incrementd at block 178. If at block 180 the in-call count is greater than a predetermined number (2 in the preferred embodiment), the reference is adjusted to the current in-call reference, the in-call count is reset to zero and the system goes out of the in-call state at block 140.

We claim:

1. In a detector system in which objects are detected using an inductive sensor and an oscillator having a oscillator signal that is a function of the inductance of the inductive sensor, and wherein error may be induced into the detector system when in the presence of an external periodic source which produces a periodic source signal, a method for filtering the effects of the external periodic source, comprising the steps of:

(a) determining a filtering period based on the periodic source signal frequency;

(b) counting cycles of the oscillator signal during the filtering period to produce a measurement value;

(c) comparing the measurement value to a reference value; and (d) signalling an object detection if the measurement value and reference values differ by at least a threshold amount.

2. The method according to claim 1 wherein the filtering period is an integer number of cycles of the periodic source signal.

3. The method according to claim 1 wherein the external periodic source is a power line.

4. The method according to claim 3 wherein the filtering period is an integer multiple of 16.67 ms.

5. In a detector system in which objects are detected using an inductive sensor and an oscillator having a oscillator signal that is a function of the inductance of the inductive sensor, and wherein error may be induced into the detector system when in the presence of an external periodic source which produces a periodic source signal, a method for filtering the effects of the external periodic source, comprising the steps of:

(a) determining a filtering period based on the periodic source signal frequency;

(b) counting cycles of the oscillator signal during the filtering period to produce a measurement value, such that noise induced into the measurement value during a positive portion of the external periodic source signal is cancelled by noise induced during a negative part of the external periodic source signal;

(c) comparing the measurement value to a reference value; and (d) signalling an object detection if the measurement value and reference values differ by at least a threshold amount.

\* \* \* \* \*